United States Patent [19]
Bianchi

[11] 3,935,317
[45] Jan. 27, 1976

[54] PREPARATION OF RED AND ROSE WINES
[76] Inventor: Joseph S. Bianchi, 551 Miguel Place, Fullerton, Calif. 92635
[22] Filed: May 30, 1974
[21] Appl. No.: 474,523

[52] U.S. Cl. .................. 426/15; 426/14; 426/431; 426/494; 426/592
[51] Int. Cl.² ........................................ C12G 1/00
[58] Field of Search ............ 426/15, 431, 592, 493, 426/14, 494

[56] References Cited
OTHER PUBLICATIONS
Amerine et al., The Technology of Wine Making, The Avi Publishing Co. Inc., Westport, Conn., 3rd Ed., 1972, (pp. 366–369).

Primary Examiner—David M. Naff
Attorney, Agent, or Firm—William C. Babcock

[57] ABSTRACT

Red or Rose wine is prepared by fermenting juice and pulp from grapes with colored skins by a process which involves separating skins from juice and pulp, digesting the skins with an aqueous mixture of citric acid and an acid selected from the group consisting of hydrochloric, sulfuric and phosphoric to extract coloring material, protein and aromatic substances, neutralizing the resultant extract with sodium carbonate or the like and adding the neutralized extract to the juice and pulp prior to completing fermentation to wine to provide a wine having a desired color and taste.

10 Claims, No Drawings

PREPARATION OF RED AND ROSE WINES

BACKGROUND OF THE INVENTION

1. Field of the Invention

Wine making process.

2. Description of the Prior Art

In the past, it has been the practice to crush the grapes, with the juice, pulp and skins then being disposed in fermentation vats. Soon after the above described material is placed in the fermentation tanks or vats, yeast is added thereto to cause the fermentation of the material into wine. After the yeast is added to the material in the fermentation vats, the skins of the grapes start rising and thereafter float as a mat on the top of the liquid material in the vat. During fermentation of the material in the vats, carbon dioxide is discharged and rises upwardly therefrom, but the skins, as it accumulates on the surface of the liquid material in the vat as a mat tends to prevent this gas from escaping to the ambient atmosphere.

The floating skins are subjected on the bottom to the carbon dioxide being generated by the fermentation process, and on the top the pressure of the ambient atmosphere, and as a result the skins are pressed together as a compact mat or cap that acts as a barrier to impede the escape of carbon dioxide from the fermenting material.

During the exothermic fermentation reaction substantial heat is generated, and this mat acts to prevent the escape of the heat to the ambient atmosphere. A further discharge of the mat above described is that it serves to harbor and encourage the propagation of numerous undesirable bacteria that are anaerobic and are tolerant to the alcoholic content of the fermenting liquid.

To permit the extraction of color and other essential matter from the skins. The mat must be kept moist, and periodically broken up either by manually stirring or using power driven paddles, sprinklers, agitators or the like. This breaking up of the mat to permit the fermentation process to proceed is not only costly and time consuming, but involves much labor. The mat furthermore acts as an insulator and impedes the escape of heat from the fermenting liquid in the vat. In the event the temperature rises to an unduly high degree in the vat there is a loss of aromatic essentials from the fermenting liquid as well as the liquid acquiring an undesirable color. Should the temperature of the fermenting liquid rise too high, the yeast may be totally destroyed, and the mass will then become what is known as a "stuck must." Furthermore, wine fermented in the above described manner requires special equipment to pump and separate the wine from the skins after the fermentation has progressed and this in itself is hazardous with respect to the quality of the wine as well as being expensive.

The primary object in developing the present process is to substantially eliminate the operational disadvantages of prior art wine making processes in that the juice and pulp of grapes are fermented out of contact with the skins, inasmuch as no mat is formed in the fermentation vats, the carbon dioxide generated during the fermentation may escape freely therefrom to the ambient atmosphere, and heat generated by the exothermic fermentation process will likewise be dissipated, as a result, the fermentation process will be carried out with a substantial reduction in labor, a saving in time, less wear on equipment, and easier control of temperature.

Another object of the invention is to supply a process in which the wine resulting from the fermentation is of a substantially uniform color and taste, and a wine that is free of wild bacteria that may add objectionable characteristics thereto from the standpoint of bouquet, appearance and taste.

A still further object of the invention is to supply a process in which the pressed grapes are subjected to an aqueous mixture of an acid, such as hydrochloric acid and citric acid to provide an extract that contains coloring material from the grapes, protein and aromatic substances, with this extract subsequently having the hydrochloric acid therein neutralized with sodium carbonate or a like material. The extract is then added to the fermenting grape material prior to completion of the fermentation process to add a desired color to the wine resulting therefrom.

Yet another object of the invention is to supply a process for fermenting grapes in which the wine resulting therefrom is of a sugstantially uniform characteristic both as to taste and color appearance that is not possible by prior art processes without the expenditure of great effort and time, and the supervision of highly skilled personnel.

A further object of the invention is to supply a process in which the skin that has had the coloring at least partially leached therefrom is subsequently combined with approximately 0.4N acid to provide a base material that may be partially neutralized, have sugar added and fermented with yeast, with the alcohol resulting therefrom distilled off to provide a brandy base or specialty wine.

SUMMARY OF THE INVENTION

My improved process for the fermentation of colored grapes into red or rose wine comprises the steps of de-stemming and crushing the grapes, with the crushed grapes thereafter being subjected to a pressing operation to separate the juice and pulp from the skin of the grapes. The above steps, as well as those steps hereinafter described, may be carried out with conventional equipment found in a modern day winery. The separated juice and pulp either by screening or centrifuging is transformed into a pourable grape material of desired consistency. This grape material is discharged into a fermentation vat to which yeast is added to ferment the material into wine. During the fermentation process carbon dioxide is generated and discharged from the fermenting material by passing to the ambient atmosphere.

The pressed skins are subjected to an aqueous mixture of hydrochloric acid and citric acid to obtain a colored acidic extract. This extract has the hydrochloric acid therein neutralized with a material such as sodium carbonate or the like. The partially neutralized colored extract that has a pH of less than 7 is now added to the fermenting grape material prior to completion of the fermentation process, and such quantity as to impart a desired color and bouquet to the wine that results from the fermentation. The above described process permits the fermentation of the grape and wine in a minimum of time and with a minimum possibility of the fermentation being contaminated by wild or undesired organisms, and also eliminates the expensive step of separating the fermented wine from the skin at or before the conclusion of the fermentation operation.

The skins that have had the color at least partially leached therefrom then may be subjected to the action of 0.4N hydrochloric acid to further disintegrate the fibers of the pumace, with the resulting mixture then being at least partially neutralized having sugar added thereto and fermented with yeast. The resulting alcohol is subsequently distilled therefrom to provide a brandy base or specialty wine.

Also, the process permits the preparation of wine having a desired color or hue, as well as taste characteristics that are difficult, if not impossible, to obtain by prior art fermentation processes.

DESCRIPTION OF THE PREFERRED EMBODIMENT

Prior to the present invention, it has been considered necessary in the wine industry to concurrently ferment the juice, pulp and skins to produce red and rose wine from grapes containing various pigments in and beneath the skins. The purpose in fermenting the whole crushed grape together with the skins is to permit yeast fermentation to act upon and extract a desired color, protein and aromatic substances from the skins as well as the essentials that are derived from the grape bodies.

In the above described prior art process, the pigment, together with various essentials, are released out of the grape skins as the fermentation process continues and the alcoholic content of the fermenting mass increases. These prior art fermentation processes as previously mentioned, have the operational disadvantages that soon after the fermenting process is initiated, the crushed skins of the grapes rise to the top of the liquid in the fermentation vat, and these skins are by pressure from above and below pressed into a mat or cap that is substantially impervious. This mat or cap impedes the escape of carbon dioxide from the fermenting liquid to the atmosphere, as well as limiting the free passage of heat from the fermentation vat to the ambient atmosphere.

In the present process the operational disadvantages inherent to forming a mat or cap on the fermenting liquid is eliminated, and as a consequence, carbondioxide and heat may flow freely from the fermenting liquid to the ambient atmosphere, and as a result the fermentation process may be carried out more rapidly and in a more uniform manner than is possible with fermentation processes as they have been conducted in the past.

The present process has the operational advantage that less refrigeration is required during the fermentation process to control the exothermic heat generated as the fermentation of the grape substance proceeds.

In my process, the grapes are de-stemmed and crushed in a conventional manner as now employed in wineries, with the grapes thereafter being directed to a dejuicer, and then to a press to accomplish the complete separation of the skins from the juice and pulp of the grapes, with the grape body substance free of skins then being screened or centrifuged to a desired consistency after which it is transferred to a fermentation vat. Yeast is then added to the grape substance in the fermentation vat, and fermentation of the grape substance is initiated to transform the same into wine.

During the fermentation of the grape substance in the vat, exothermic heat is generated, together with carbon dioxide, both of which are free to flow to the ambient atmosphere. Due to the carbon dioxide and heat arising during the fermentation process being dissipated to the ambient atmosphere, I have found it requires less auxiliary refrigeration or cooling equipment during the fermentation of the grape substance into wine.

After the pressed, color bearing skins have been separated from the juice and pulp, the skins are conveyed to a suitable container, preferably one formed from stainless steel or a metal free lined vessel, where the pressed skins are treated with an aqueous mixture comprising three parts of a high purity, iron free, hydrochloric acid and citric acid, with the aqueous mixture being in sufficient volume to bathe the pressed skins.

The aqueous solution of hydrochloric acid and citric acid should be approximately 0.1N, and the quantity should approximate 1 gallon for each 10 pounds of pressed skins.

From experience, I have found that the aqueous acidic solution is preferably heated to between 120° to 160°F prior to the pressed skins being added thereto. After the skins have been added to the acidic aqueous solution, mild agitation of the skins should be employed, and the skins being subjected to the acidic solution for a period of from 2 to 6 hours. The length of this period will depend upon the nature and type of the grape skins, the temperature of the solution, as well as the normalcy of the latter.

Various types of equipment may be employed for subjecting the pressed skins to the acidic solution; for example, a finned rotating cylinder which tumbles the skins and the solution for the required period of time.

After the pressed skins and the acidic solution have been allowed to react as above described, the solution that contains color protein and aromatic essentials leached from the skins is drained from the latter, and transferred to a separate container. The colored acidic solution is partially neutralized with an appropriate agent, such as sodium carbonate or the like. The partial neutralizing of the solution is carried out in a conventional manner, and by visual means such as titrating the progress of the neutralizing may be observed. When all of the hydrochloric acid has been neutralized, it will be noted that there is a sharp break in the observed neutralizing action, which may be a change in color if a titration operation is being conducted, or rapid movement of the indicator if electrical means are employed to determine the progress of the neutralization.

The partially neutralized colored liquid resulting from the above described operation is now added to the fermenting grape substance, prior to completion of the fermentation thereof. From experience, I found it preferable to add the partially neutralized colored liquid or extract to the fermenting grape substance when the fermentation operation of the latter is approximately sixty percent completed, with the quantity of the colored liquid so added being such as to impart a desired color and hue to the completed wine.

Due to the above described partial neutralizing operation, an extremely small amount of sodium chloride will be generated and will remain in the colored liquid or extract that is added to the fermenting grape substance. The amount of this sodium chloride will be approximately 200 parts per million by weight to the fermenting grape substance, and this salt does not detract from the wine quality nor does it impede the yeast growth in the final stages of fermentation. As a matter of fact, some wine markers have already recognized the beneficial effect of salt on wine production and add as much as 600 parts per million to the fermenting liquid to achieve an improved quality in wine. The quantity of salt added due to the partial neutralizing operation is substantially less than that found in many natural foods, including meats, and common vegetables. The citric acid is likewise considered to be of no consequence, for it is in fact employed in the wine making art to ameliorate the wine. Using citric acid in the above described manner assures that the colored liquid or extract will at all times have a pH less than 7, and complex organic compounds in the extract that impart a pleasing taste and aroma to the wine will be preserved.

Further utilization may be made of the grape skins after the coloring and complex organic compounds have been partially extracted therefrom. The residue is subjected to an aqueous hydrochloric acid solution that is preferably 0.4 N. The acidic solution tends to further break down the fibrous structure of the skins, with additional coloring and complex organic compounds going into solution. The resulting acidic solution is at least partially neutralized with sodium carbonate or a like agent and after adding sugar it is then fermented with yeast. The alcohol resulting from the fermentation is now distilled therefrom to provide a brandy base or the distilled substance may be used to produce a specialty wine.

Although the process has been described as using hydrochloric acid, due to the high degree of ionization thereof in the dilute state, it is also possible to use sulfuric, phosphoric acid and the like in lieu thereof.

In the above description sodium carbonate has been described as the neutralizing agent, however, it will be apparent that potassium carbonate, sodium hydroxide or potassium hydroxide or the like could be used for this purpose if desired. Otherwise a process of deionization or electrolysis may likewise be applied.

Although the invention has been described in connection with the making of red wine it will be apparent that the same process may be used on the skins of white grapes to extract fermentable material therefrom and increase the yield of white wine.

The use and operation of the process has been described previously in detail and need not be repeated.

I claim:

1. A fermentation process for making wine from grapes having colored skins, which process includes the steps of:
   a. de-stemming and crushing said grapes;
   b. pressing said de-stemmed and crushed grapes to separate the juice and pulp from the skins thereof;
   c. disposing said juice and pulp in a container in which they are in free communication with the ambient atmosphere;
   d. adding yeast to said juice and pulp to cause the fermentation thereof;
   e. subjecting said skins to the action of an aqueous mixture of citric acid and an acid selected from the group consisting of hydrochloric, sulfuric and phosphoric acids until a substantial amount of the coloring substance has been withdrawn from said skins and colors said aqueous mixture to provide an aqueous colored extract and thereafter separating said colored extract from said skins;
   f. partially neutralizing said colored extract by neutralizing said acid from said group therein with a non-toxic material;
   g. allowing said yeast to ferment said juice and pulp to wine, with carbon dioxide and exothermic heat generated by said fermentation being allowed to flow to the ambient atmosphere; and
   h. adding said colored partially neutralized aqueous extract to said juice and pulp prior to the fermentation thereof to wine having been completed by said yeast.

2. A process as described in claim 1 which includes the further step of:
   i. subjecting said pulp and juice to a screening operation to transform said juice and pulp into a liquid of desired consistency before disposing said liquid in said container.

3. A process as described in claim 1 which includes the additional step of:
   i. centrifuging said pulp and juice to transform the latter into a liquid of desired consistency before disposing said liquid in said container.

4. A process as defined in claim 1 which includes the further step of:
   i. heating said aqueous mixture to between 120° and 160° F prior to subjecting said skins thereto.

5. A process as defined in claim 1 which includes the further step of:
   i. heating said aqueous mixture to between 120° and 160°F prior to subjecting said skins thereto, and agitating said skins with said aqueous mixture for a substantial length of time prior to partially neutralizing said mixture.

6. A process as defined in claim 1 in which said aqueous mixture is approximately 0.1N and said mixture is present in approximately 1 gallon for each 10 pounds of skins.

7. A process as defined in claim 1 which includes the further step of:
   i. subjecting said colored partially neutralized extract to vacuum distillation to deepen the color thereof prior to said extract being added to said juice and pulp.

8. A process as defined in claim 1 in which said non-toxic material is selected from the group consisting of sodium carbonate, potassium carbonate, sodium hydroxide and potassium hydroxide.

9. A process as defined in claim 1 which includes the further steps of:
   i. subjecting said skin, after first extraction to a stronger aqueous solution of hydrochloric acid to disintegrate said skins to the extent that further coloring and essential organic compounds are withdrawn therefrom and dissolved in said aqueous solution;
   j. partially neutralizing said aqueous solution by adding a neutralizing agent thereto;
   k. separating said partially neutralized solution from said skins, and adding sugar thereto;
   l. adding yeast to said partially neutralized, sweetened solution to cause the fermentation thereof; and
   m. distilling said partially neutralized sweetened solution after it has fermented to obtain a distillate in the form of a brandy base therefrom.

10. A process for the fermentation of colored grapes into a colored wine that comprises the steps of:
   a. de-stemming and crushing said grapes;
   b. dejuicing and pressing said grapes to separate the juice and pulp from the skins of said grapes;
   c. transforming said juice and pulp into a pourable grape material of a desired consistency;

d. adding yeast to said grape material to ferment the latter into wine;
e. digesting said skins that have been pressed with an aqueous mixture of hydrochloric acid and citric acid to obtain a colored acidic extract;
f. partially neutralizing said colored acidic extract with a non-toxic material; and
g. adding said extract that has been partially neutralized to said grape material and yeast in such quantity as to impart a desired color and bouquet to the wine that results from the fermentation of said grape material.

* * * * *